United States Patent [19]

Mayer

[11] Patent Number: 4,505,124
[45] Date of Patent: Mar. 19, 1985

[54] HEAT MANAGEMENT SYSTEM FOR AIRCRAFT

[75] Inventor: Arnold H. Mayer, Huber Heights, Ohio

[73] Assignee: The United States of America as represented by the Secretary of the Air Force, Washington, D.C.

[21] Appl. No.: 534,996

[22] Filed: Sep. 22, 1983

[51] Int. Cl.³ .................... F25D 17/00; B64D 37/00
[52] U.S. Cl. ...................... 62/180; 123/553; 244/117 A; 244/135 R; 60/736; 60/730; 165/41; 62/239; 62/238.6
[58] Field of Search .......... 62/430, 239, 238.6, 62/180, 323.1, 323.3, 323.2; 237/12.3 R, 2 B, 12.1; 123/541, 557, 553; 244/117 A, 135 R; 60/736, 730; 165/41, 42

[56] References Cited

U.S. PATENT DOCUMENTS

| | | | |
|---|---|---|---|
| 2,917,903 | 12/1959 | Stineman et al. | 62/55 |
| 2,941,372 | 6/1960 | Taylor | 62/239 X |
| 2,943,828 | 7/1960 | Van Driest | 62/239 X |
| 3,015,461 | 1/1962 | Fineblum | 244/117 |
| 3,410,502 | 11/1968 | Leadon et al. | 244/1 |
| 3,929,305 | 12/1975 | Sabol | 244/117 A |
| 4,263,786 | 4/1981 | Eng | 62/430 X |

Primary Examiner—Henry Bennett
Attorney, Agent, or Firm—Donald J. Singer; Bobby D. Scearce

[57] ABSTRACT

A novel heat management system for aircraft is provided which is based on the aircraft fuel as the heat exchange medium and comprises a dedicated thermal reserve fuel tank for containing refrigerated aircraft fuel (or other expendable liquid) which is cooled by heat exchange with the primary aircraft fuel flow to the engines, a fuel line loop for conducting fuel through a plurality of heat exchangers associated with cooling loops for heat generating aircraft systems, and a central microprocessor based controller for controlling fuel flow and temperature throughout the fuel loop system and into the aircraft engine.

13 Claims, 14 Drawing Figures

HEAT MANAGEMENT SYSTEM FOR AIRCRAFT

RIGHTS OF THE GOVERNMENT

The invention described herein may be manufactured and used by or for the Government of the United States for all governmental purposes without the payment of any royalty.

BACKGROUND OF THE INVENTION

This invention relates generally to environmental control systems for aircraft, and more particularly to a novel aircraft fuel-based heat management system for controlling aircraft engine fuel temperature and for providing heat rejection capability for heat-generating aircraft systems.

Conventional environmental control systems for aircraft rely to a significant degree upon heat exchange with the atmosphere in order to achieve cooling. The reliance upon heat exchange with ambient constrains the operation of such environmental control system to aircraft speed and altitude limits within which the atmosphere presents a practical heat sink for that system. Further, the ingestion into occupied aircraft compartments of ambient atmospheric air may be undesirable in certain instances involving an environment contaminated with airborn chemical or bacteriological agents. The existence of air inlets and outlets on the aircraft, particularly associated with heat rejection, also detracts from the stealthiness of the aircraft. Certain existing heat exchange systems may be configured to rely partially upon heat exchange with the fuel, but these systems are capable of servicing relatively small heat loads thereby, and are wholly inadequate for meeting total long-range aircraft mission heat rejection requirements without substantial reliance upon exchange with ambient.

The novel heat management system for aircraft disclosed herein provides an onboard heat rejection system which may be based exclusively upon the use of an expendable liquid, such as aircraft fuel, which is capable of storing thermal energy. In a preferred embodiment of this invention heat exchange between on-board heat generating systems and aircraft fuel may be accomplished by incorporating into a uniquely configured fuel loop a dedicated fuel tank for storing fuel which is cooled by heat exchange with the aircraft primary fuel flow. The novel system of this invention may have the heat management capacity sufficient to avoid the need for any auxiliary ambient air based source of cooling for the aircraft.

The system described herein may include two separate cooling configurations, operable alternately or in combination, to manage the heat sink capacity of the aircraft fuel, and, simultaneously, to maintain the engine fuel temperature below a maximum desirable operating limit. First, the flow rate through the primary engine fuel line may be maintained above that required for consumption by the engines, and the excess may be recirculated to a main fuel tank. Second, a dedicated fuel tank chiller loop which rejects heat to the primary fuel flow, may refrigerate fuel stored in the dedicated fuel tank at levels which may permit completion of a mission without exceeding the maximum desirable engine fuel temperature and without the use of supplementary cooling systems.

The components of the system of the present invention comprise a fuel line loop representing the cooling cycle coupled on its low temperature side to a dedicated thermal reserve fuel tank and on its high temperature side to the fuel stream to the aircraft engine(s); a microcomputer based controller monitors the fuel line flow and temperature at a plurality of locations throughout the system and controls the fuel flow both to the engine and through the recirculation loop; one or more heat exchange subsystems using the fuel flow as a heat exchange medium may be included to maintain various aircraft systems at temperatures consistent with the schedule of aircraft heat generation profiles and mission cooling requirements.

The controlling parameter for operation of the heat management system of this invention is the temperature of the aircraft fuel entering the fuel line(s) to the engine(s). The objective of the heat management system of this invention is to reject substantially all heat loads of the aircraft systems to the fuel stream while maintaining the fuel temperature typically below a specified upper design limit. Depending upon the aircraft, engine type, and fuel system design, this temperature may typically be in the range of from about 140° F. (60° C.) to about 300° F. (149° C.), the maximum allowable upper limit being related to the coking temperature of the fuel at which point the risk of fouling engine fuel lines and other fuel supply components becomes significant, or being related to the cavitation limits of the fuel pumps. Further, during certain aircraft mission phases, the combination of fuel temperature and flow rate may result in the maximum allowable fuel temperature being exceeded when all aircraft heat loads are rejected to the fuel stream, but during other mission phases the fuel may assume a temperature well below the maximum desirable limit. Therefore, during aircraft operating periods during which the fuel temperature is below the said limit the active cooling cycle of the novel heat management system of this invention is functional to cool the fuel of the dedicated thermal reserve fuel tank, which, during periods of undesirable fuel temperature excursions, may, in an alternative functional embodiment hereof, provide a source of chilled fuel to blend with the main fuel flow to the engine to ensure that the maximum allowable fuel temperature limit is not exceeded.

The novel heat management system of the present invention, in providing a system for absorbing aircraft heat loads during an entire mission without the use of an ambient air based auxiliary system, lowers aircraft observability by substantially eliminating air inlets and outlets associated with or characterizing ambient based environmental control systems.

Aircraft operation reliability is improved by providing nearly constant temperature heat sink for cooling the aircraft avionics systems. Fuel consumption associated with environmental control systems operation is significantly reduced, resulting in fuel savings and extended aircraft range.

It is, therefore, an object of this invention to provide an improved heat management system for aircraft.

It is a further object of this invention to provide an improved fuel-based cooling system for heat generating aircraft systems.

These and other objects of the present invention will become apparent as the description of representative embodiments proceeds.

3

SUMMARY OF THE INVENTION

In accordance with the foregoing principles and objects of the present invention, a novel heat management system for aircraft is provided which is based on the aircraft fuel as the heat exchange medium and comprises a dedicated thermal reserve fuel tank for containing refrigerated aircraft fuel (or other expendable liquid) which is cooled by heat exchange with the primary aircraft fuel flow to the engines, a fuel line loop for conducting fuel through a plurality of heat exchangers associated with cooling loops for heat generating aircraft systems, and a central microprocessor based controller for controlling fuel flow and temperature throughout the fuel loop system and into the aircraft engine.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
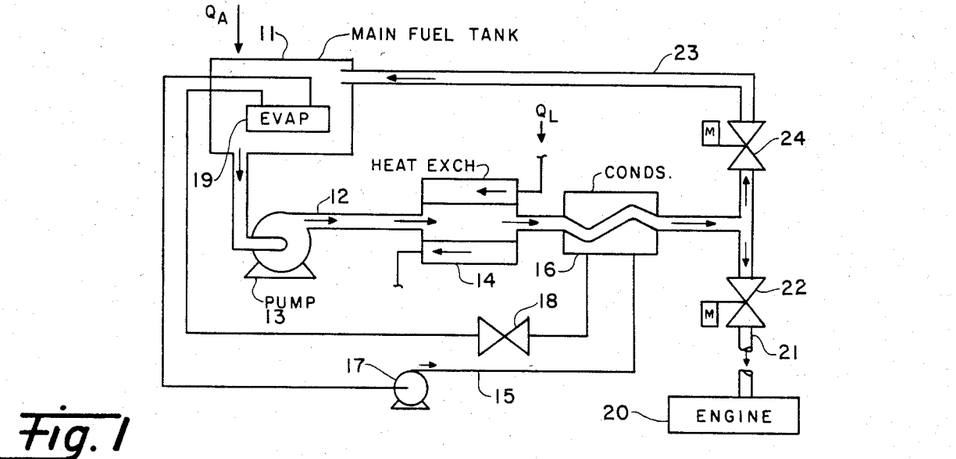
FIG. 1 is a schematic of one embodiment of the present invention illustrating the recirculation loop and typical heat rejection systems thermally interfacing the fuel flow.

Referring now to the drawings, FIG. 1 is a schematic illustration of an abbreviated system of the invention for rejecting heat to the fuel stream of an aircraft. Aircraft fuel is supplied from a main fuel tank 11 to fuel line 12 through a main fuel pump 13. Heat exchanger 14, thermally interfacing the fuel flow in fuel line 12, may be provided to extract heat, $Q_L$, from aircraft electrical and other heat generating systems. In order to take advantage of additional cooling capacity of the fuel stream within fuel line 12, a chiller (evaporator) loop 15 may be provided, and may include a condenser 16 thermally interfacing the fuel flow within fuel line 12, a compressor 17, thermal expansion valve 18, and an evaporator 19 within fuel tank 11 or otherwise in thermal contact with the fuel contained therein. Chiller loop 15 may contain freon or other fluorocarbon refrigerant conventionally employed for cooling system purposes. In the systems depicted in FIGS. 1, 1a and 2, for purposes of clarity, all fuel flow lines are represented by double lines, whereas the various refrigerant circulating cooling loops are depicted by single lines. Fuel flow to the engine 20 through fuel line 21 may be controlled through control valve 22. In order to maintain the fuel temperature below a maximum allowable upper limit, fuel flow through line 12 may need to be in excess of momentaneous engine 20 requirements (i.e., flowing through line 21) in order to absorb the desirable quantities of heat, viz., $Q_L$. Excess fuel may therefore be recycled to the main fuel tank 11, through return fuel loop 23, by suitable control of control valve 24, to take advantage of any aerothermal cooling $Q_A$ to which the fuel contained in the main tank 11 may be subjected during the mission.

Figure 1A:
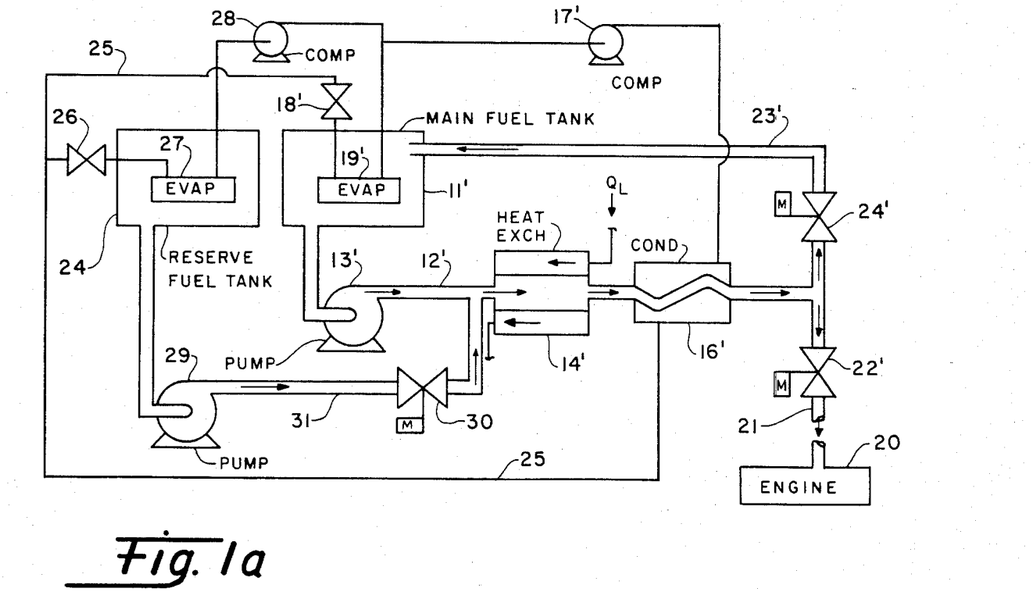
FIG. 1a is a schematic of an alternative embodiment illustrating the use of a thermal reserve tank for chilling fuel for a terminal mission segment.

Referring now to FIG. 1a, presented therein is an alternate embodiment to that of FIG. 1 and including certain components similar to the system of FIG. 1 (and similarly numbered) but having additional features including a separate reserve fuel tank 24 for containing a reserve fuel supply for a terminal mission segment which fuel is chilled to a temperature (e.g., about 0° F.) much lower than that of the fuel contained in main fuel tank 11'. In order to accomplish this cooling, a two-stage chiller loop 25 may be provided including condenser 16' thermally interfacing the fuel flow within fuel line 12', thermal expansion valve 18', evaporator 19' thermally interfacing the fuel in main fuel tank 11', and compressor 17'. The other stage of loop 25 interfaces reserve fuel tank 24 and includes thermal expansion valve 26, evaporator 27 thermally interfacing the reserve fuel in tank 24, and a compressor 28. The two-stage loop 25 may be used to selectively chill the fuel contained in either or both tanks 11', 24. The capacity of thermal reserve tank 24 need not be great since a substantial portion of mission duration is available to accomplish chilling. For terminal mission phases, the fuel contained in reserve tank 24 may be used for engine 20 consumption by suitable control of fuel pump 29 and control valve 30 to direct fuel through line 31 into fuel line 12' as shown in FIG. 1a.

Figure 2:
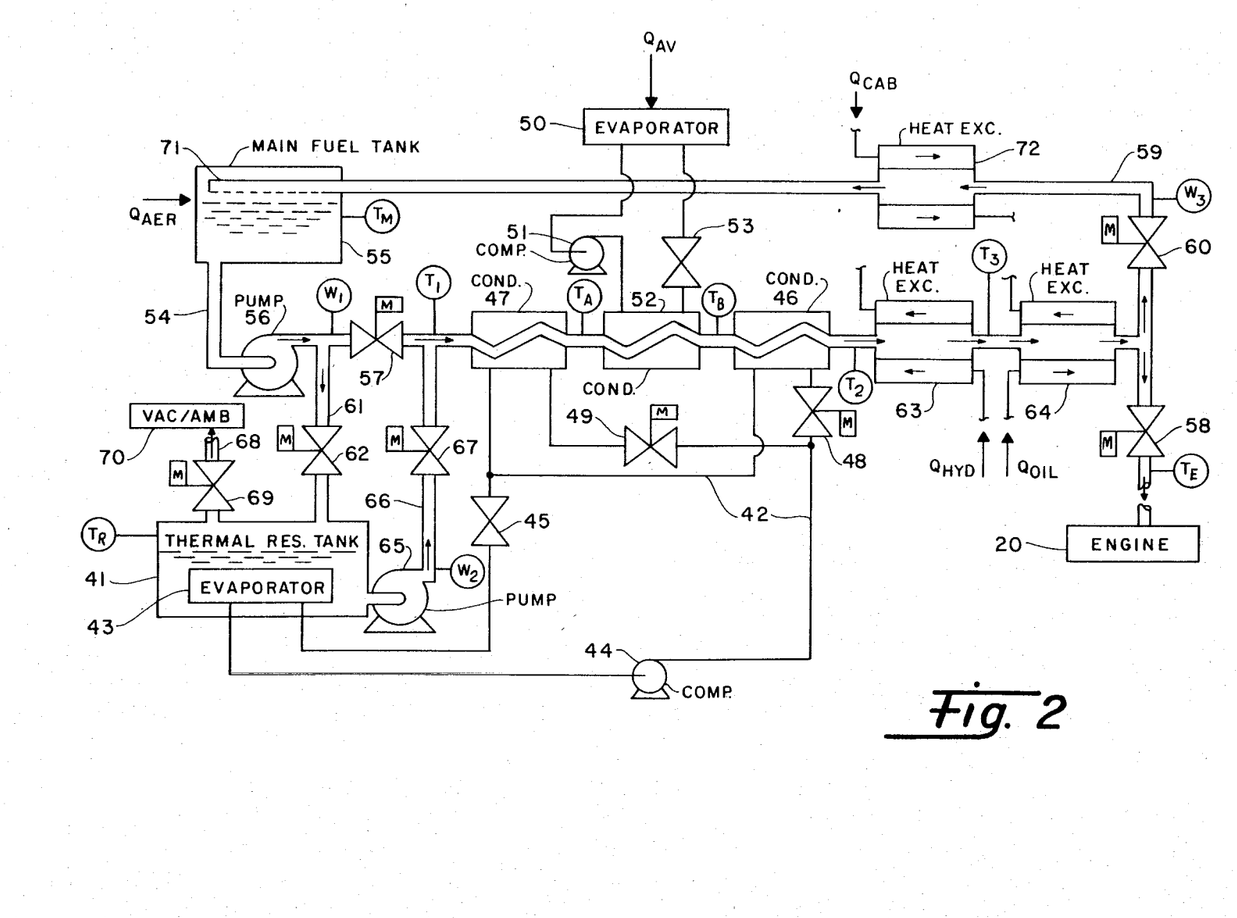
FIG. 2 is a schematic of an alternative embodiment of the present invention including the thermal reserve tank and cooling loops for heat generating aircraft systems.

Referring now to FIG. 2, presented therein is an alternative embodiment of the present invention including a thermal reserve tank 41 for storing cooled fuel, and a plurality of cooling loops for extracting heat from onboard heat generating systems. As shown in FIG. 2, a dedicated thermal reserve fuel tank 41 is chilled by a vapor cycle chiller loop 42 comprising an evaporator 43 within tank 41 or otherwise in thermal contact with the fuel in tank 41 to absorb heat therefrom, a compressor 44, thermal expansion valve 45, and a pair of condensers 46 and 47 whose loads can be controlled, respectively, by vapor flow control valves 48 and 49. The chiller loop 42 for tank 41 may, similarly to previously mentioned loops, contain freon or other fluorocarbon refrigerant conventionally employed for cooling system purposes. Reserve tank 41 is preferably insulated against adventitious heat leaks or gains and may be represented by an aircraft body fuel tank.

A second cooling loop may be provided to extract heat $Q_{AV}$ from the aircraft avionics system. The avionics cooling loop may comprise an evaporator 50, which absorbs the avionics heat load $Q_{AV}$, a compressor 51, condenser 52, and a thermal expansion valve 53. This loop may also contain freon or other suitable refrigerant. In order to provide the appropriate control over the temperature of the fuel flowing to the engine 20, as hereinafter described, the compressor 44 in the reserve fuel tank cooling loop 42 and compressor 51 in the avionics loop preferably have variable speed control in order to provide variable load capacity control in each loop in an energy efficient manner. Otherwise, a hot gas bypass could be employed.

Fuel may be supplied to the aircraft engines 20 from a fuel flow line, designated generally as 54, from the aircraft fuel tanks, represented by main fuel tank 55. Fuel tank 55 is generally representative of the plurality of fuel tanks which comprise the fuel source for the aircraft engines 20, including tanks provided in the wings of the aircraft, and may therefore be subject to aerothermal cooling $Q_{AER}$. The fuel line 54 may therefore provide a source of coolant fluid flow for absorption of heat from a plurality of heat exchange systems thermally interfacing the fuel flow, as depicted in FIG. 2.

The fuel flow through fuel line 54 is provided by fuel pump 56 which feeds the fuel system through control valve 57. The fuel flow rate to the aircraft engines 20 is controlled by a control valve 58. Fuel flow in excess of instantaneous engine requirements may be controlled within the recirculation fuel flow loop 59 by control valve 60, for recirculation of fuel back to the main fuel tank 55, in manner similar to loops 23, 23' of FIGS. 1 and 1a. Fuel may also be supplied to thermal reserve fuel tank 41, if desired for such purposes as thermal mixing of fuel or replenishing the reserve supply, through fuel line 61 controlled by control valve 62.

Both the thermal reserve fuel tank cooling loop 42 and the avionics cooling loop (50-53) may reject heat to fuel flowing within fuel loop 54. As shown in FIG. 2, the heat rejected by the reserve tank chiller loop 42 may be rejected at two points, viz., condensers 46 and 47, one placed in the fuel flow line 54 upstream of, and the other downstream of, the avionics loop, for the purpose of controlling the temperature of the fuel entering condenser 52 of the avionics cooling loop to maintain to the extent practicable a nonfluctuating temperature sink for that system or other temperature critical system.

Other heat exchange systems using the fuel as a heat sink may be inserted into the system of FIG. 2, preferably downstream of the reserve tank chiller loop 42 and the avionics loop (50-53). Representative of such systems may be heat exchanger 63 for rejecting heat $Q_{HYD}$ from the aircraft hydraulic system, and heat exchanger 64 for rejecting heat $Q_{OIL}$ from the aircraft engine oil.

The thermal reserve fuel tank 41 may be provided with a fuel pump 65 to feed the main fuel flow line 54 through a fuel line 66, with the fuel flow therethrough being controlled by control valve 67. It is noted that the fuel line subsystem comprising pump 65, fuel line 66 and control valve 67 may be used in conjunction with or separate from the main fuel supply system (54,56,57) to supply engine 20 fuel flow requirements, as appropriate.

An additional ambient based or other conventional cooling system 70 may be included to provide supplementary cooling capability for thermal reserve tank 41 to allow for possible failure of certain critical components within the heat rejection system of this invention and affecting cooling of fuel in reserve tank 41. Representative of such supplementary cooling systems 70 suitable for use herein may be one based on the adiabatic vaporization of fuel stored in the dedicated thermal reserve fuel tank 41 as shown in FIG. 2. This supplementary system 70 may be connected to tank 41 through such as line 68. Such system based on vaporization of stored fuel may be activated through control valve 69 to conduct fuel vapors either to a vacuum system connected to line 68 or to the nearby ambient airstream. By dedicating the fuel stored in reserve tank 41 to achieve cooling in this manner, an approximate 50° F. (28 centigrade degrees) temperature reduction of the reserve tank fuel 41 may be achieved by vaporizing no more than about 15% of the fuel contained therein. Under actual mission conditions a considerably smaller required temperature reduction (i.e., a few centigrade degrees) would be anticipated. This scheme lends itself desirably to ground operation to preclude a mission start with fuel at a temperature higher than desirable resulting from preflight conditions such as the aircraft being parked on a hot runway.

Other auxiliary cooling systems to supplement the operation of the heat sink system of this invention are contemplated herein as might occur to one with skill in the field of this invention, and, therefore, the supplementary system just suggested is representative only, and not presented by way of limitation. A supplementary vacuum system may, however, be preferable over an auxiliary system interfacing with ambient to preserve the stealthiness of the aircraft.

Means such as that represented in FIG. 2 as fuel spray bar 71 may be provided within main fuel tank 55 to cool the fuel returned to tank 55 through recirculation loop 59. For example, recirculated fuel may be sprayed against the internal surfaces of the main fuel tanks 55 disposed in the outboard regions of a wing to take advantage of aerothermal cooling. As shown in FIG. 2, useful additional cooling capacity of recirculated fuel may be effected by including in fuel recirculation loop 59 a heat exchanger 72 incorporating flow (or recirculation) of aircraft cabin exhaust air (represented by $Q_{CAB}$).

The heat management system of the present invention may be configured for control of the various components thereof by a single microcomputer controller comprising, in a nonlimiting representative embodiment hereof, a commercially available central microprocessor unit of conventional design and operation, a program/data memory, and input/output ports fed through analog-to-digital and digtal-to-analog converters, as appropriate, or directly to and from analog or digital sensors or control actuators in the heat management system. The microprocessor controller may be of any desirable type or capacity consistent with the requirements for handling data generated by the heat management system, and with the constraints for interfacing with the aircraft systems which interface with the heat management system represented by FIGS. 1, 1a or 2.

Figure 3:
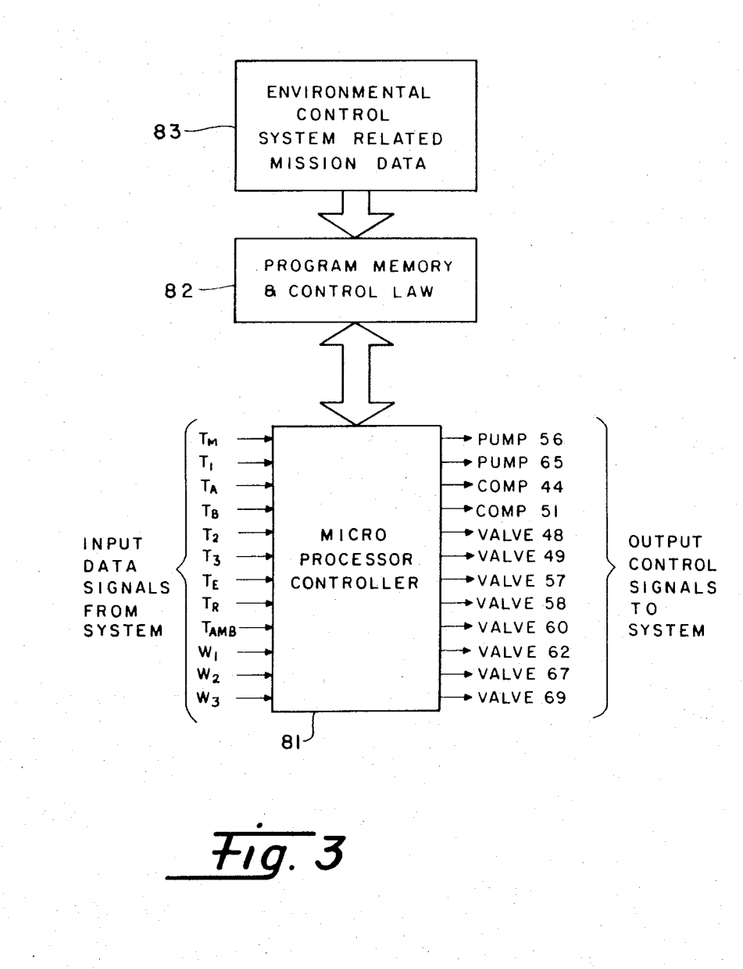
FIG. 3 is a schematic representation of the microprocessor based controller for the system including notations of system data input and control output functions of the controller.

Referring now to FIG. 3, a microprocessor controller 81 may provide the memory, input/output signal communication, computational and decision-making capability for the fuel-based heat management system described herein. At all times during a flight, a program which has been previously stored in the controller's memory 82 is executed based on inputs received from sensors monitoring the thermophysical states and the operational status of the heat management system. In the simulation studies described hereinafter, the program used to accomplish the desired system control was "EASY", a government owned, general purpose program for environmental control system transient analysis. Execution of the stored program results in the accomplishment of the dual control functions of, (1) thermally managing the fuel heat sink capacity for adequacy throughout the flight mission and (2) controlling the fuel temperature to the engine 20 at a level below the allowable limit. Timely output control signals are sent to control the operation of valves, fuel pumps, refrigeration compressors and drive motors to accomplish these functions.

The controller 81, in the representative embodiment described herein, may command various combinations of actions by each of the components of the heat management system such as set forth in FIGS. 1, 1a and 2 as follows. Operational input data signals on the instantaneous state of the heat management system is continuously fed into the controller 81, as suggested in FIG. 3. For proper operation of the system, such as that shown in FIG. 2, it is desirable to control various parameters within the system including the temperature $T_E$ of the fuel entering the engine 20, the temperature and quantity of fuel in reserve tank 41, and the quantities of heat rejected, respectively, to condensers 46 and 47 to provide a substantially constant temperature heat sink in condenser 52 for the avionics cooling loop (50-53). To accomplish this, in the representative embodiment shown in FIG. 2, fuel temperature is monitored to provide the controller 81 with the fuel temperatures T of the main fuel tank 55, T at the inlet of condenser 47, $T_A$ at the inlet of condenser 52, $T_B$ at the inlet of condenser 46, $T_2$ at the inlet of heat exchanger 63, $T_3$ at the inlet of heat exchanger 64, $T_E$ entering the engine 20, $T_R$ of the reserve tank 41 and the ambient temperature $T_{AMB}$. Fuel flow rates W may be monitored such as $W_1$ entering control valve 57, $W_2$ exiting pump 65, and $W_3$ through control valve 60 in fuel loop 59. The controller 81 may then control the operation of pumps 56 and 65, compressors 44 and 51, and control valves 48, 49, 57, 58, 60, 62, 67 and 69, as appropriate, according to a preprogrammed scheme 83 for control of fuel temperatures according to anticipated mission heat loads and cooling requirements. For example, thermal blending of fuel streams from main tank 55 and thermal reserve tank 41 to satisfy engine fuel flow and temperature requirements may be accomplished by suitable control of pumps 56 and 65 and control valves 57 and 67; fuel feed from the main tank 55 to the thermal reserve tank 41 to replenish the reserve is accomplished by suitable control of control valve 62; recirculation of excess fuel through fuel loop 59 back to the main tank 55 is accomplished by suitable control of valve 60; the avionics cooling loop heat sink temperature (within condenser 52) is controlled through control valves 48 and 49 and compressor 44 which regulate the quantities of heat rejected in condensers 46 and 47, respectively upstream and downstream of condenser 52. The use of an auxiliary system 70 may be effected through suitable control of valve 69.

Conditions may arise during mission use of the novel heat management system described herein whereby the combination of fuel flow rate through the fuel line 54 to the aircraft engines 20 with the instantaneous heat loads placed upon the system precludes control of engine 20 fuel temperature due to momentary inadequate thermal storage capability of the thermal reserve tank 41. Under this condition the controller will increase the fuel flow rate from the main fuel tank 55 and recirculate any excess fuel over that required for engine 20 operation (as controlled by control valve 58) back through fuel loop 59 to the main fuel tank 55, for cooling by means such as fuel spray bar 71.

Central to the operation of the heat management system of the present invention incorporating the microprocessor controller 81 of FIG. 3 is the establishment of the stored cold energy requirements schedule throughout a mission, which may be based either upon design mission analysis data 83 or upon a statistical analysis of operational heat load histories for a particular aircraft or mission. For example, the schedule may be developed in nondimensional form as a function of the percentage of mission elapsed and then correlated versus normalized instantaneous fuel level. Therefore, by inputting mission planning data such as mission duration, fuel flow schedule, and fuel load, the cold storage requirements may be tailored for a particular mission. This statagem also changes the control law from an open loop to one that is dependent on mission states, i.e., fuel quantity. This computation is accomplished by the microprocessor 81 at the beginning of a mission based on standard atmospheric weather assumptions or meterological forecasts and corrected during the course of the mission for actual atmospheric weather and heat load profiles and trends as they evolve.

The microprocessor 81 also calculates the amount of stored refrigeration in the thermal reserve tank 41 that is required at various fuel demand levels and the level at which the thermal reserve tank chiller loop 42 must operate to achieve the required cold storage in a timely manner. During periods in which it is necessary to build up cold energy storage in the thermal reserve tank 41 but operation of the chiller compressor 44 is not possible because the engine fuel temperature is at its upper limit and will not allow chiller cycle 42 heat to be rejected to the engine fuel stream 54, the controller 81 may activate the supplementary cooling system 70 for the thermal reserve tank as described above.

Whenever possible, during mission use of the heat management system described herein, the main fuel tank 55 will preferably be the sole source of fuel to the engine 20. However, adventitious temperature excursions for one or more systems affecting the operation of this system or other aircraft systems which interface with it may cause engine 20 fuel temperature to exceed desirable limits. In this condition, the controller 81 may command the system to blend fuel from the thermal reserve tank 41 with that of the main fuel tank 55, which may be accomplished by commanding flow from tank 41 through pump 65, fuel line 66 and control valve 67.

The fuel temperature most desirable for consumption by the engine may thus be maintained.

Simulation studies of the heat sink system depicted in FIG. 1 revealed that in most practical instances, the heat absorbing capacity of the aircraft fuel tends to be depleted near the end of the aircraft mission, consonant with substantially total consumption of the original fuel supply. This is especially true for missions having a terminal segment, during which time the combination of aircraft head loads and recirculation and fuel quantities present in the fuel tank would lead to overheating of the engine fuel. As a practical matter, however, the fuel supply is not totally consumed at mission end, but a severe potential overheating exists by reason of the diminution of supply. In this terminal phase of the mission, tank fuel chilling would no longer be practical, and fuel recirculation to the main fuel tank would be expected to result in a runaway fuel temperature unless the fuel temperature were low enough upon entry into this phase to allow completion of the mission without fuel overheat. The wasteful manner in which this situation would be handled using conventional systems would include applying substantial refrigeration to a large supply of fuel in earlier phases of the mission to ensure a sufficiently low main tank fuel temperature for the diminished supply near mission end.

The use of a separate additional dedicated tank as disclosed herein manages the heat sink capacity of the original fuel supply in a more energy efficient manner, especially so if the dedicated tank is thermally insulated. Optimally, the dedicated tank will have a storage capacity equal to the aircraft fuel requirements for the terminal phase, and may be chilled at a leisurely rate in earlier mission phases, thereby necessitating smaller capacity refrigeration equipment, and at the same time allowing its heat sink capacity to be managed to compensate for hot premission fuel conditions and aerothermal fuel heating (or cooling) during the mission.

The controlling parameter for the implementation of the heat management system of this invention, either that configured in FIGS. 1, 1a or 2, remains basically the fuel flow rate to the engines 20 as controlled by control valve 22 of FIG. 1, 22' of FIG. 1a or 58 of FIG. 2, so that the fuel flow therethrough at all mission times meets instantaneous engine 20 requirements. Concurrently, control valves 24, 24' and 60 of FIGS. 1, 1a and 2, respectively, provide the required recirculation through the fuel recirculation loops 23, 23' and 59 consistent with the heat absorption by the fuel from the various heat exchange systems thermally interfacing therewith. The fuel pump (13, 13' or 56) associated with the main fuel tank is preselected to be of sufficient capacity to meet all anticipated fuel flow requirements.

Figure 4:
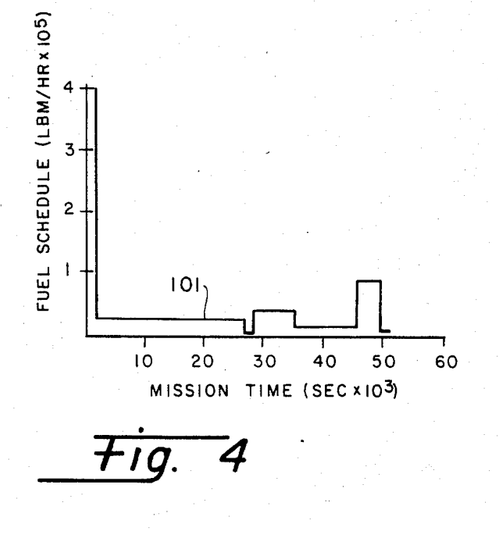
FIG. 4 presents a graph of simulated aircraft fuel consumption as a function of mission time for a typical long range aircraft.
Figure 5:
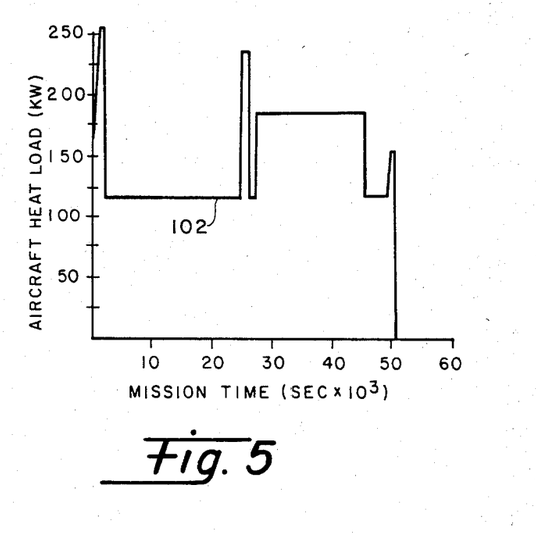
FIG. 5 presents a graph of aircraft heat load schedule as a function of mission time for a typical long range aircraft.
Figure 6:
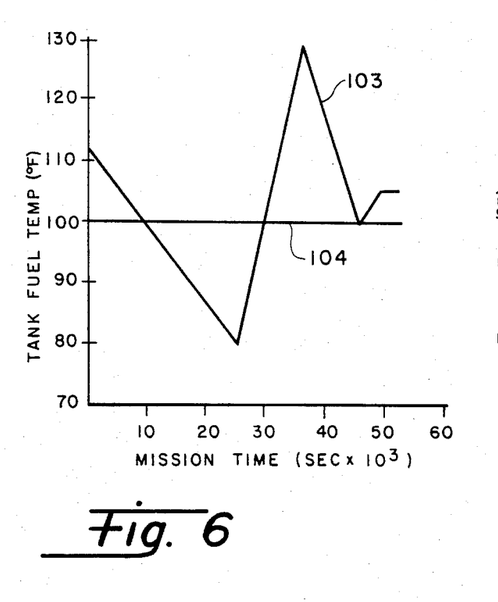
FIG. 6 presents graphs of aircraft tank fuel temperature as a function of mission time for an uninsulated tank for a typical long range aircraft not utilizing tank fuel recirculation.
Figure 7:
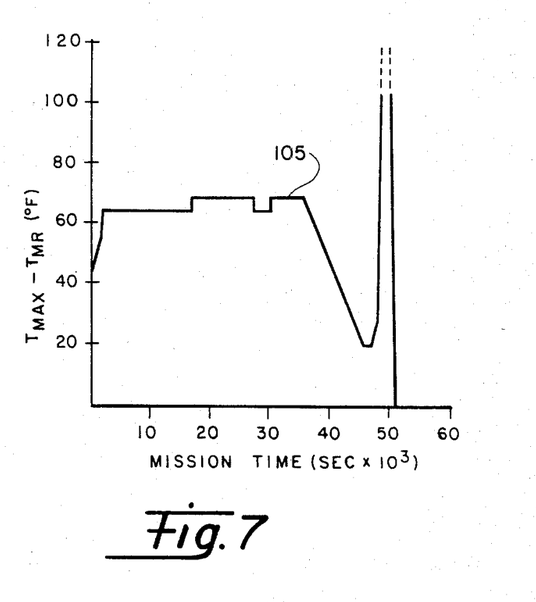
FIG. 7 presents a graph of the degree of fuel subcooling required for the typical long range aircraft as a function of mission time in order to preclude overheating the engine fuel flow.

The simulations performed using the system of FIG. 1 used input data profiles on fuel load, temperature, and aircraft systems heat generation appropriate to a modern long range aircraft. Referring now to FIGS. 4, 5 and 6 of the drawings, graphs 101, 102, and 103, respectively, show characteristic histories as functions of mission time for the engine 20 fuel consumption, aircraft heat load schedule, and main tank fuel 11 temperature anticipated for a typical mission using no reserve tank chilling or main fuel recirculation. The data presented by graph 103 of FIG. 6 may be interpreted as specifying the aerothermal heat flux into the main fuel tank 11 over the course of the mission. For comparative purposes, graph 104 of FIG. 6 shows typical main tank 11 temperature for a thermally insulated main tank and no chilling or recirculation. In FIG. 7, graph 105 presents a measure of the subcooling required to maintain the temperature of the fuel to the engine 20 at or below the acceptable $T_{MAX}$, i.e., graph 105 shows the temperature difference, as a function of mission time, between the allowable maximum fuel temperature, and the temperature $T_{MR}$ required to be maintained in an insulated main fuel tank 11 to complete the mission without accounting for the effects of aerothermal heating or cooling.

Figure 8:
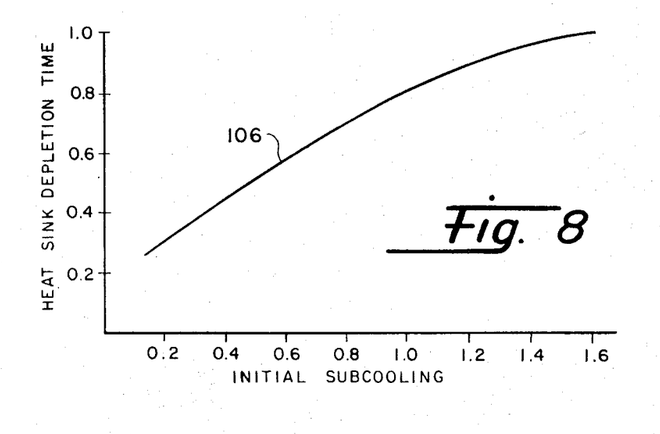
FIG. 8 presents a graph of the heat sink depletion time as a function of initial subcooling for the main tank of a single tank system of a typical long range aircraft.

Graph 106 of FIG. 8 shows the results of a series of simulations for which the time was noted at which the tank fuel reached the engine fuel temperature limit as a function of initial subcooling below the engine fuel temperature limit $T_{MAX}$. No fuel tank chilling or aerothermal heating were considered, although recirculation was used in the simulation to maintain the engine 20 fuel temperature at or below $T_{MAX}$ for as long as possible. Graph 106 indicates that tank fuel may be used as a heat sink without chilling for greater portions of the mission as the initial subcooling is increased. Further, graph 106 shows that a minimum initial cold energy storage in the fuel tank equal to about 160% of the integrated heat load would be required to complete a mission without auxiliary cooling for the particular example analyzed.

Figure 9:
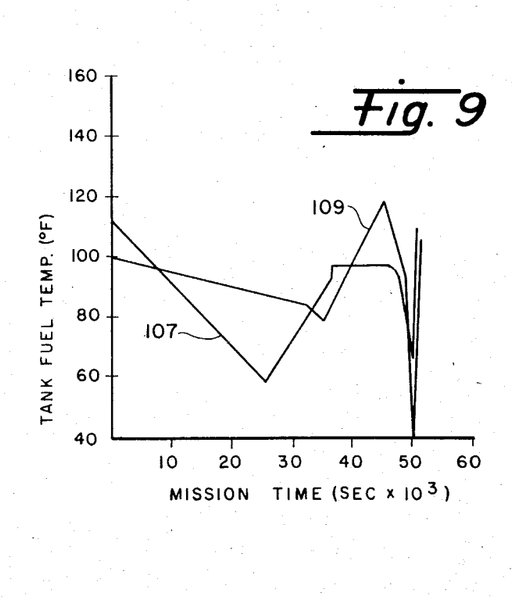
FIG. 9 presents the aircraft tank fuel temperature history as a function of mission time, wherein recirculation and reserve tank chilling is utilized, for both insulated and uninsulated fuel tanks.

The fuel tank temperature history as a function of mission time wherein both recirculation and reserve tank chilling control as exemplified by this invention may be used is shown by graph 107 of FIG. 9. The engine 20 fuel temperature for the same mission conditions is shown by graph 108 of FIG. 10. Significantly, by use of the heat management system of the present invention, the engine fuel temperature may be conveniently controlled at or below the engine fuel temperature limit $T_{MAX}$ throughout the mission, especially when compared to the engine fuel temperature profile without recirculation as presented in FIG. 11 by graph 111.

Figure 10:
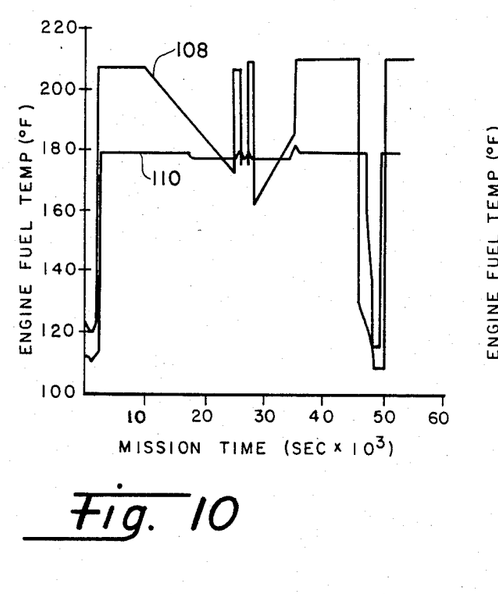
FIG. 10 presents graphs of engine fuel temperature history as a function of mission time for an uninsulated tank having a 210° F. maximum allowed fuel temperature, and for an insulated tank having a 180° F. maximum allowed fuel temperature.
Figure 11:
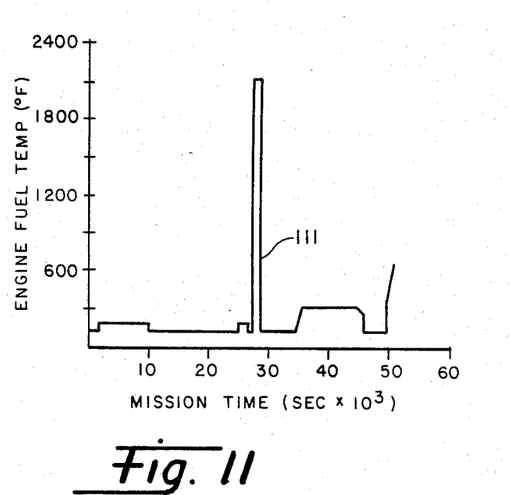
FIG. 11 presents a graph of the engine fuel temperature as a function of mission time without utilizing recirculation.

Again, by way of comparison, graph 109 of FIG. 9 and graph 110 of FIG. 10 show data for an insulated tank analogous to that shown, respectively, by graphs 107 and 108.

Figure 12:
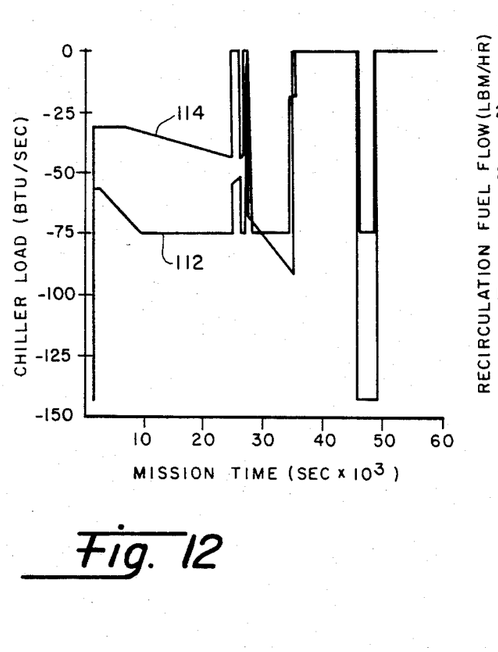
FIG. 12 presents graphs of the chiller load history as a function of mission time for insulated and uninsulated tanks.
Figure 13:
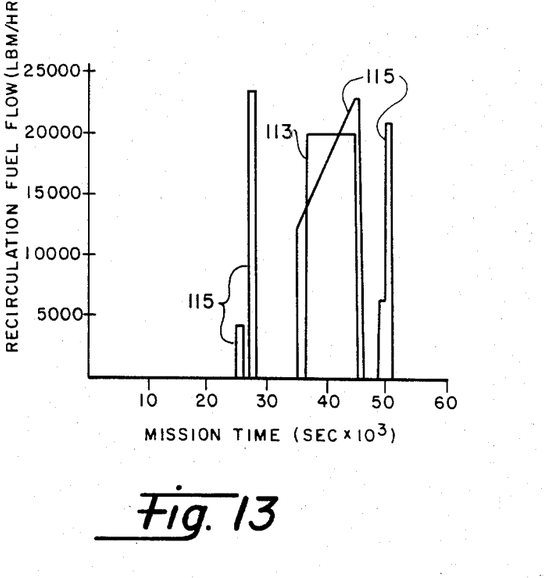
FIG. 13 presents graphs of the recirculation fuel flow history as a function of mission time for insulated and uninsulated tanks.

Referring now to FIGS. 12 and 13, graphs 112 and 113 show the appropriate fuel tank chiller load history and the recirculation flow history, respectively, for the mission conditions defined by the data presented in FIGS. 4, 5 and 6. The data of graphs 112 and 113 of FIGS. 12 and 13 show that for conditions for which the initial fuel temperature is about 113° F. (45° C.), or several degrees hotter than a typical hot day, and the engine fuel temperature limit is 210° F. (99° C.), a chiller refrigeration capacity of about 23 tons will suffice for the heat management system of the present invention.

Graphs 114 of FIG. 12 and 115 of FIG. 13 show analogous data to that presented by graphs 112 and 113, respectively, for an insulated tank. However, as shown in FIG. 10, the fuel temperature limit $T_{MAX}$ of 180° F. (82° C.) was used, but indicated a chiller refrigeration capacity as low as about 45 tons to be appropriate notwithstanding the more severe (lower) $T_{MAX}$ limitation.

The present invention, as herein described, therefore provides an improved fuel-based heat management system for aircraft which may be configured and operated to be substantially self-contained without interface with ambient. It is understood that certain modifications to the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. A heat management system for an aircraft having an engine, a main fuel tank for storage and supply of fuel for said engine, a first fuel line through which fuel is supplied from said main fuel tank to said engine for consumption therein, and a main fuel pump for pumping said fuel from said main fuel tank to said engine through said first fuel line, comprising:
   a. a cooling loop thermally interfacing the fuel flow through said first fuel line for extracting heat from the fuel contained in said main fuel tank by circulation of a refrigerant through said loop, said loop including a condenser near said first fuel line intermediate said main fuel pump and said engine, said condenser thermally interfacing the fuel flow through said first fuel line, an evaporator near said main fuel tank and thermally interfacing the fuel contained therein, and a thermal expansion valve and compressor intermediate said condenser and evaporator for circulating said refrigerant through said loop;
   b. a second fuel line interconnecting said main fuel tank with said first fuel line at a point intermediate said condenser and said engine, for recirculating to said main fuel tank fuel flowing through said first fuel line in excess of momentaneous engine consumption requirements; and
   c. a first control valve for controlling the flow of fuel through said second fuel line.

2. The heat management system as recited in claim 1, further comprising:
   d. means for monitoring the fuel flow rate in each said fuel line, said means providing an output signal characteristic of the fuel flow rate in each said line;
   e. temperature sensing means for monitoring the temperature of the fuel at a plurality of predetermined points within the said heat management system, said temperature sensing means providing a plurality of output signals characteristic of the temperatures at said plurality of points; and
   f. means, responsive to said output signals, for controlling the fuel flow through each said fuel flow line whereby the fuel flow rate to said engine is positively controlled and the temperature of the fuel flowing to said engine is maintained below a predetermined maximum level.

3. The heat management system as recited in claim 1, further comprising, a heat exchanger for exchanging heat from a heat producing system of said aircraft with said fuel, said heat exchanger disposed near said first fuel line intermediate said main fuel pump and the point of connection of said second fuel line, said heat exchanger thermally interfacing the fuel flow through said first fuel line.

4. The heat management system as recited in claim 1, further comprising, a heat exchanger for exchanging heat from a heat producing system of said aircraft with the fuel flowing through said second fuel line, said heat exchanger disposed near said second fuel line intermediate said main fuel tank and the point of connection of said first fuel line and said second fuel line and thermally interfacing the fuel flow through said second fuel line.

5. A heat management system for an aircraft having an engine, a main fuel tank for storage and supply of fuel for said engine, a first fuel line through which fuel is supplied from said main fuel tank to said engine for consumption therein, and a main fuel pump for pumping said fuel from said main fuel tank to said engine through said first fuel line, comprising:
   a. a reserve tank for containing cooled fuel;
   b. a cooling loop, thermally interfacing the fuel flow through said first fuel line, for extracting heat from the fuel contained in said reserve tank by circulation of a refrigerant through said loop, said loop including a condenser near said first fuel line intermediate said main fuel pump and said engine, said condenser thermally interfacing the fuel flow through said first fuel line, an evaporator near said reserve tank and thermally interfacing the fuel contained therein, and a thermal expansion valve and compressor intermediate said condenser and evaporator for circulating said refrigerant through said loop;
   c. a second fuel line interconnecting said main fuel tank with said first fuel line at a point intermediate said condenser and said engine, for recirculating to said main fuel tank fuel flowing through said fuel line in excess of momentaneous engine consumption requirements; and
   d. a first control valve for controlling the flow of fuel through said second fuel line.

6. The heat management system as recited in claim 5, further comprising, a second cooling loop, thermally interfacing the fuel flow through said first fuel line, for extracting heat from the fuel contained in said main tank by circulation of a refrigerant through said second loop, said second loop connected to said condenser near said first fuel line and including a second evaporator near said main tank and thermally interfacing the fuel contained therein, and a second thermal expansion valve and second compressor intermediate said condenser and second evaporator for circulating said refrigerant through said loop.

7. The heat management system as recited in claim 5, further comprising, a first heat exchanger for exchanging heat from a heat producing system of said aircraft with the fuel flowing through said first fuel line, said first heat exchanger disposed near said first fuel line intermediate said main fuel pump and the point of connection of said first fuel line and said second fuel line and thermally interfacing the fuel flow through said first fuel line.

8. The heat management system as recited in claim 5, further comprising, a second heat exchanger for exchanging heat from a heat producing system of said aircraft with the fuel flowing through said second fuel line, said second heat exchanger disposed near said second fuel line intermediate said main fuel tank and the point of connection of said first fuel line and said second fuel line and thermally interfacing the fuel flow through said second fuel line.

9. The heat management system as recited in claim 5, further comprising, a third fuel line, interconnecting said reserve tank and said first fuel line at a point intermediate said main fuel pump and said condenser, a second control valve in said third fuel line for controlling the flow of fuel therethrough, and a reserve fuel pump for selectively pumping fuel from said reserve tank into said first fuel line for mixing therein of cooled fuel from said reserve tank with that from said main fuel tank.

10. The heat management system as recited in claim 9, further comprising, a third control valve in said first fuel line intermediate said main fuel pump and the point of connection of said second fuel line with said first fuel line, a third fuel line interconnecting said reserve fuel tank and said first fuel line at a point intermediate said main fuel pump and said third control valve, and a fourth control valve for controlling fuel flow through said third fuel line from said main fuel tank to said reserve fuel tank.

11. The heat management system as recited in claim 5, further comprising means, connected to said reserve tank, for cooling the fuel contained therein by controllably evaporating a portion of said fuel contained in said reserve tank.

12. The heat management system as recited in claim 11 wherein said means for cooling said fuel includes a vacuum system and control valve operatively connected to said reserve tank.

13. The heat management system as recited in claim 5, further comprising:
   e. means for monitoring the fuel flow rate in each said fuel line, said means providing an output signal characteristic of the fuel flow rate in each said line;
   f. temperature sensing means for monitoring the temperature of the fuel at a plurality of predetermined points within the said heat management system, said temperature sensing means providing a plurality of output signals characteristic of the temperatures at said plurality of points; and
   g. means, responsive to said output signals, for controlling the fuel flow through each said fuel flow line whereby the fuel flow rate to said engine is positively controlled and the temperature of the fuel flowing to said engine is maintained below a predetermined maximum level.

* * * * *